US012298012B2

(12) United States Patent
Niederer

(10) Patent No.: US 12,298,012 B2
(45) Date of Patent: May 13, 2025

(54) ELECTRIC HEATING DEVICE

(71) Applicant: Eberspächer catem GmbH & Co. KG, Herxheim (DE)

(72) Inventor: Michael Niederer, Kapellen-Drusweiler (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 1176 days.

(21) Appl. No.: 17/132,633

(22) Filed: Dec. 23, 2020

(65) Prior Publication Data

US 2021/0199306 A1 Jul. 1, 2021

(30) Foreign Application Priority Data

Dec. 27, 2019 (DE) ..................... 10 2019 220 591.7

(51) Int. Cl.
*F24C 7/06* (2006.01)
*F24C 7/08* (2006.01)
*H05B 1/02* (2006.01)

(52) U.S. Cl.
CPC .............. *F24C 7/062* (2013.01); *F24C 7/088* (2013.01); *H05B 1/0236* (2013.01); *H05B 2203/016* (2013.01); *H05B 2203/02* (2013.01); *H05B 2203/021* (2013.01)

(58) Field of Classification Search
None
See application file for complete search history.

(56) References Cited

U.S. PATENT DOCUMENTS

2012/0085742 A1* 4/2012 Niederer ............... F24H 15/335
219/385

FOREIGN PATENT DOCUMENTS

| | | | |
|---|---|---|---|
| CN | 101097092 | A | 1/2008 |
| CN | 103479207 | A | 1/2014 |
| CN | 107264231 | A | 10/2017 |
| DE | 202019005223 | | 2/2020 |
| EP | 1291202 | A2 | 3/2003 |
| EP | 2440004 | | 4/2012 |
| EP | 2772820 | | 9/2014 |

(Continued)

OTHER PUBLICATIONS

EP2772820 (A1), Bohlender et al., Sep. 2014, partial translation. (Year: 2014).*

*Primary Examiner* — Thien S Tran
(74) *Attorney, Agent, or Firm* — Boyle Fredrickson, S.C.

(57) ABSTRACT

An electric heating device comprises a housing with a partition wall which separates a connection chamber from a heating chamber for dissipating heat and from which at least one PTC heating device protrudes as a heating fin in the direction toward the heating chamber. The PTC heating device comprises at least one PTC element electrically connected to conductor tracks in the connection chamber. A temperature sensor is connected, in terms of data, to a control device and is accommodated in a sealed manner in a temperature sensor receptacle which is formed in a wall delimiting the heating chamber. The temperature sensor is accommodated in a sliding manner in the temperature sensor receptacle. A support prevents the temperature sensor from sliding out of the temperature sensor receptacle and/or directly plugs a temperature sensor contact element of the temperature sensor in the connection chamber into a printed circuit board.

13 Claims, 3 Drawing Sheets

(56) References Cited

FOREIGN PATENT DOCUMENTS

| | | | | |
|---|---|---|---|---|
| EP | 2772820 A1 * | 9/2014 | ......... | G05D 23/1917 |
| EP | 3228950 | 10/2017 | | |
| EP | 3334242 | 1/2020 | | |

* cited by examiner

ELECTRIC HEATING DEVICE

BACKGROUND OF THE INVENTION

1. Field of the Invention

The present invention relates to an electric heating device comprising a housing with a partition wall which separates a connection chamber from a heating chamber for dissipating heat and from which at least one PTC heating device protrudes as a heating fin in the direction toward the heating chamber. The PTC heating device has at least one PTC element and conductor tracks electrically connected to the PTC element for energizing the PTC element with different polarity, which are connected electrically in the connection chamber. In addition, a temperature sensor is provided as part of the electric heating device, which is connected in terms of data to a control device and accommodated in a sealed manner in a temperature sensor receptacle, which is formed in a wall delimiting the heating chamber.

2. Background of the Invention

An electric heating device with a partition wall from which PTC heating devices protrude into the heating chamber is known from EP 3 334 242 A1. This earlier application of the present applicant also discloses a control device for controlling the power current of the PTC heating devices. An electric heating device with a temperature sensor for determining the actual temperature in the heating device is known from EP 2 440 004 A.

SUMMARY

The present invention provides an electric heating device of the type mentioned initially, which in an improved manner enables a sealing accommodation of the temperature sensor in the wall.

In order to solve this problem, the present invention suggests an electric heating device comprising a housing and at least one PTC heating device. The housing has a partition wall which separates a connection chamber from a heating chamber for dissipating heat. The at least one PTC heating device protrudes from the housing as a heating fin in a direction toward the heating chamber. The PTC heating device comprises at least one PTC element and conductor tracks for energizing the PTC element with different polarity. The conductor tracks are electrically conductively connected to the PTC heating element in the connection chamber. A temperature sensor is connected, in terms of data, to a control device. The temperature sensor is accommodated in a sealed and sliding manner in a temperature sensor receptacle which is formed in a wall delimiting the heating chamber. A support, cooperating with the temperature sensor prevents the temperature sensor from sliding out of the temperature sensor receptacle.

In this electric heating device, the temperature sensor is connected in a manner known per se to a control device that controls the power current of the PTC element within the heating chamber, so that the desired amount of heat in the electric heating device is transferred to the medium to be heated, namely by specifications from the control device. This control device is usually provided as a unit on the electric heating device.

The housing is usually a housing for heating a liquid medium. The electric heating device is in particular a heating device for heating liquid media in a motor vehicle.

Thus, the heating chamber is usually sealed and only open to the outside via inlet and outlet connecting pieces through which the medium to be heated is introduced into the heating chamber and led out of it. The partition wall prevents the fluid to be heated from passing from the heating chamber into the connection chamber. Energizing of the PTC heating device usually takes place via an integrated control device, which has a power current plug and a control current plug on its outer side, in order to introduce the power current or the control current into the electric heating device, in particular the control device. The control device usually has an assembled printed circuit board. The control current is controlled by this. Furthermore, the control device can also have a contacting device which first electrically connects contact lugs protruding into the connection chamber, if necessary grouped and usually connects the corresponding contact lug at another point with the aforementioned circuit board in terms of data or current.

The wall on which the temperature sensor receptacle is formed can be any wall of the housing delimiting the heating chamber. However, it is preferred that the temperature sensor receptacle is formed in the aforementioned partition wall so that the temperature sensor protrudes from the partition wall in the same direction toward the connection chamber as contact lugs usually provided at the free ends of PTC heating devices protruding into the connection chamber to electrically connect the respective PTC heating device in the connection chamber.

Because the temperature sensor is provided in a sliding manner in the temperature sensor receptacle, it is not screwed to the temperature sensor receptacle or firmly connected to the wall in any other way, for example by gluing. Rather, the temperature sensor can be moved in the axial direction, i.e. in the direction of insertion of the temperature sensor into the temperature sensor receptacle, without losing the seal between the temperature sensor receptacle and the temperature sensor. This proposal is based on the concept that, for example, a screw connection for fastening the temperature sensor can become loose due to vibrations acting in the vehicle.

In the solution according to the invention, a seal of the temperature sensor is usually supported against a cylindrical wall and can move axially relative to this wall in the installed state without losing the sealing effect. The heating device according to the invention has a support that interacts with the temperature sensor. This support is provided to prevent the temperature sensor from sliding out of the temperature sensor receptacle. The support usually has a stop against which the temperature sensor hits when it maximally slides out of the temperature sensor receptacle so that the temperature sensor remains in the sealed position within the temperature sensor receptacle. Thereby, the support usually acts directly against the housing of the temperature sensor. This can be extended, for example, in the direction of insertion by a support projection which protrudes beyond the other functional elements of the temperature sensor, in particular a temperature sensor contact element, through which the measurement signal of the contact sensor is transmitted.

The temperature sensor may be supported on a side opposite the heating chamber and the partition wall. If, for example, the temperature sensor contact element is connected to a printed circuit board and accommodated in it, the support is located on a side of the printed circuit board opposite the partition wall and the heating chamber.

According to a further aspect, the present invention suggests to accommodate the at least one temperature sensor contact element in a printed circuit board arranged in the connection chamber. The temperature sensor contact element is, accordingly, exposed in the connection chamber. The connection chamber is regularly the part of the electric heating device in which also the contact lugs of the individual PTC heating devices are electrically connected. Accordingly, the contact lugs as well as the temperature sensor contact elements protrude into the connection chamber in the same direction and are contacted there. This solution offers the advantage that both the PTC heating devices and the temperature sensor can be plugged in directly or indirectly with the printed circuit board.

According to a further development, the temperature sensor has a retaining projection which protrudes through the printed circuit board and is accommodated in a guide bore of the same. This guide bore is recessed in the printed circuit board as a usually circumferentially closed bore. The guide bore guides the retaining projection so that, when the temperature sensor contact element is joined to conductor tracks of the circuit board by relative movement of the temperature sensor and the circuit board, the circuit board, guided by the engagement of the retaining projection in the guide bore, is first positioned and guided relative to the temperature sensor and the temperature sensor contact element projecting from it. In the course of the joining movement, the temperature sensor contact element is accordingly inevitably positioned exactly relative to the contact lug holder of the printed circuit board.

According to a further development of the present invention, the temperature sensor is supported on a housing cover which covers a chamber accommodating the printed circuit board. Thereby, the printed circuit board is usually located between the housing upper part forming the partition wall and the said housing cover. The aforementioned chamber may be the connection chamber. The support may be done by the retaining projection.

In order to reduce possible elastic deformations of the housing cover, which can negatively influence the support of the temperature sensor, the support on the housing cover should be provided relatively close to the edge of the housing cover, where the housing cover is usually connected to the housing upper part. Thus, the support provided on the housing cover is reinforced by areas of the housing upper part. The housing cover is usually connected to the housing upper part in a form-fit manner. This can be done by flanging or by means of a latch connection. The housing cover is usually a sheet metal product or element that has been cut to shape by punching and at least provided with a circumferential edge by bending, which surrounds the housing upper part circumferentially. Thereby, the housing cover usually forms a circumferential groove close to the edge of a housing cover surface to accommodate a seal between the housing upper part and the housing cover. The housing cover surface can be stamped to form stiffening ribs.

In order to reduce the dimensions taken up by the temperature sensor, it is suggested according to a further development of the present invention that the housing cover be provided with a support projection projecting towards the temperature sensor, which cooperates with the previously mentioned retaining projection of the temperature sensor in order to prevent it from accidentally slipping out of the temperature sensor receptacle.

BRIEF DESCRIPTION OF THE DRAWINGS

Further details and advantages of the present invention are provided in the following description of an embodiment in connection with the drawing. Therein.

DETAILED DESCRIPTION

Figure 1:
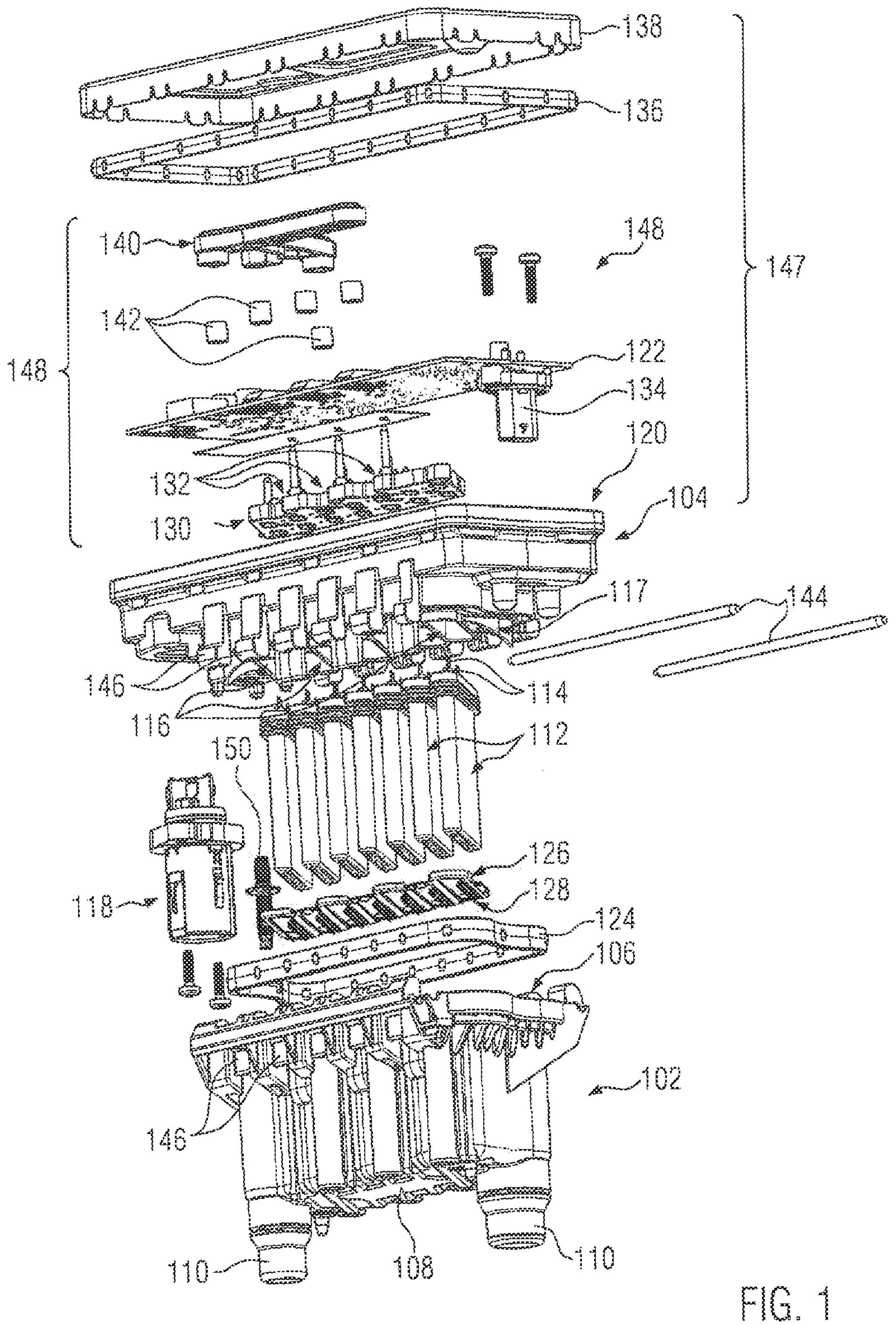
FIG. 1 shows an exploded view of an embodiment of an electric heating device.

FIG. 1 shows an embodiment of an electric heating device 100 with a multi-part housing comprising a housing lower part 102 made of plastic and a housing upper part 104 made of metal in one piece by die casting.

The housing lower part 102 is trough-shaped and encloses a heating chamber 106, for which inlet and outlet connecting pieces 110 protruding from a base 108 are provided. These inlet and outlet connecting pieces 110 are formed in one piece with the housing lower part 102 by injection molding.

The inlet and outlet connecting pieces 110 protrude beyond the base 108. They go off at right angles from a planar surface formed by the base 108.

Between the housing upper part 104 and the housing lower part 102, the Figure shows a plurality of PTC heating devices 112, which comprise PTC elements provided within the PTC heating devices 112, which are contacted in an electrically conductive manner via conductor tracks. The conductor tracks are electrically connected via contact lugs 114. The PTC heating devices 112 are plugged into the provided receptacles 116 of a partition 117 of the housing upper part 104. Details of this configuration are described in EP 3 334 242 A1, which dates back to the applicant.

Between the housing lower part 102 and the housing upper part 104, further elements of the heating device 100 are shown. A high-voltage plug-in element is identified by reference sign 118 which is screwed to the housing lower part 104 and has contact elements protruding into a connection chamber 120 of the housing upper part 104. These contact elements are electrically connected to a printed circuit board identified by reference sign 122, which can be accommodated in the trough-shaped housing upper part 104. A seal is identified with reference sign 124, which seals the housing lower part 102 against the housing upper part 104 and thus the heating chamber 106.

A retaining element 126 provided with elastic projections has individual heating device receptacles 128 accommodating the individual PTC heating devices 112, which claw with the outer circumferential surface of the individual PTC heating devices 112. In the assembled state, the retaining element 126 is also connected to the housing lower part 104 in a form-fit and/or force-locking manner.

A contacting device 130 is arranged above the housing upper part 104 and below the printed circuit board 122, which electrically connects all contact lugs 114 and groups individual PTC heating devices 112 into heating circuits. An electrical connection between the contacting device 130 and the printed circuit board 122 is established via contact lugs 132 projecting from the contacting device 130. A control signal plug-in element with reference sign 134 is shown connected to and projecting from the printed circuit board 122. This control signal plug-in element 134 is screwed against the printed circuit board 122.

Above the printed circuit board 122, another circumferential seal 136 and a control housing cover 138 are shown, which covers and seals the connection chamber 120 of the housing upper part 104. The control housing cover 138 is made of metal to shield together with the housing upper part 104 electromagnetic radiation, which is generated by switching the power current inside the control housing 104, 136, 138. Between the control box cover 138 and the printed circuit board 122, a support framework 140 is arranged, which supports compression elements 142 between itself and the printed circuit board 122, in order to, for example, press power transistors 308 mounted on the printed circuit board 122 against cooling surfaces which are connected in a heat-conducting manner with cooling domes extended into the heating chamber 106. The cooling surfaces are thermally conductively connected to the power transistors 308.

After assembly, connecting rods 144 engage behind locking projections 146, which are provided on the housing lower part 102 and the housing upper part 104, in order to connect the two parts 102, 104 in a form-fitting and captive manner. Details are described in EP 2 796 804 A1.

Together with the housing upper part 104 and the seal 136, the control housing cover 138 forms a control housing 147. Thereby, due to their metallic materials, the control housing cover 138 and the housing upper part 104 form a shielding around the control device 148 accommodated in this control housing 147, which is essentially formed by the printed circuit board 122. A connecting bolt 150 protrudes from the control housing 147 in the direction toward the plug elements 118, 134. This connecting bolt 150 serves to connect the metallic control housing 147 to an earth phase and is screwed to the control housing 147.

Figure 2:
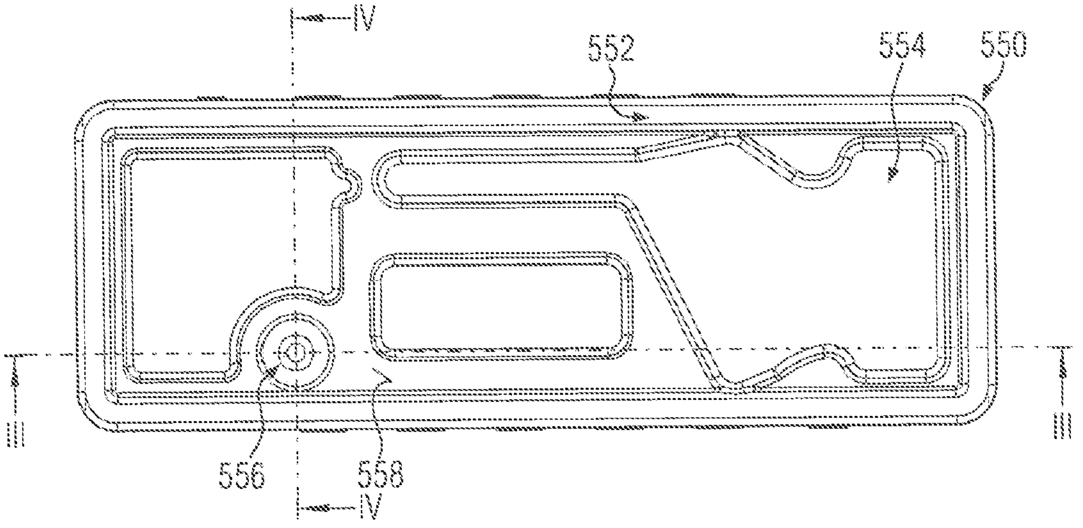
FIG. 2 shows a top view of the control housing from above.

FIG. 2 shows a top view of the control housing cover identified in FIG. 1 with reference sign 138, here with reference sign 550, which is formed by punching and bending a sheet metal material. FIG. 2 shows certain contours of the cover, which are used for stiffening on the one hand and for accommodating certain functional components on the other hand. Thus, reference sign 552 identifies a circumferential groove which accommodates the seal 136 according to FIG. 1. The deformation area of the control housing cover 500 identified by reference sign 554 serves to accommodate and position the support framework identified by reference sign 140 in FIG. 1. As can be seen from the synopsis of FIGS. 2 and 3, the contours on the upper side of the control housing cover 550 that can be recognized in FIG. 2, with the exception of the contour identified with reference sign 556, are deformations that were created by deforming a lower cover surface 558 upwards, i.e. outwards, and are therefore flush with the upper cover of the circumferential groove 552.

Reference sign 556 identifies a truncated conical support projection that protrudes inwardly and forms a support surface 560 for a temperature sensor 400 which is held in a sealed manner in a temperature sensor receptacle 506. For this purpose, the temperature sensor 400 has a temperature sensor seal 402, which is accommodated in a circumferential groove 401 formed on the outside of the temperature sensor 400. At its free end protruding into the connection chamber 120, the temperature sensor 400 has two temperature sensor contact elements 404 (cf. also FIG. 5), which are protruded by a retaining projection 406. The circuit board identified with reference sign 300 in FIGS. 2 to 5 is equipped with components 306, which serve to control the power current to the individual PTC heating devices 112. The printed circuit board 300 has a guide bore 310 to accommodate the retaining projection 406 (cf. FIG. 5).

This retaining projection 406 is aligned relative to the center of the support projection 556 of the control housing cover 550. The guide bore 310 surrounds the elongated retaining projection 406 with little play. Due to the elongated shape of the retaining projection 406 and the corresponding shape of the guide bore 310, the printed circuit board 300 is positioned relative to the contact lug receptacles 312 for the temperature sensor contact elements 404.

Figure 3:
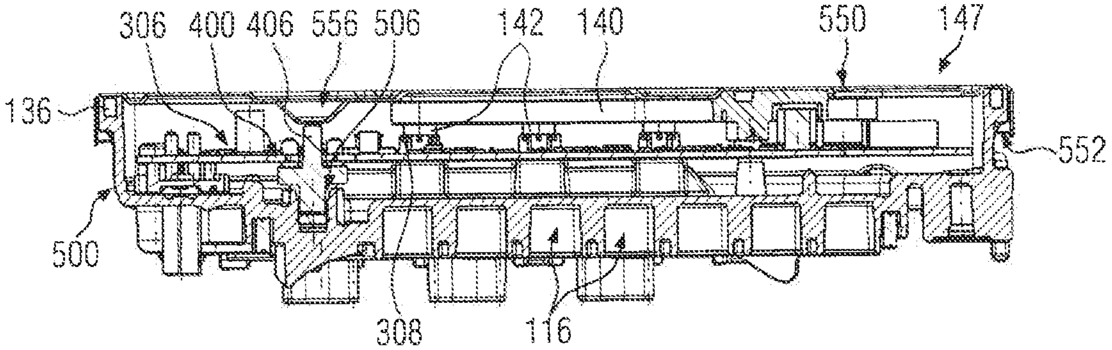
FIG. 3 shows a longitudinal section view along the line III-III as shown in FIG. 2.
Figure 4:
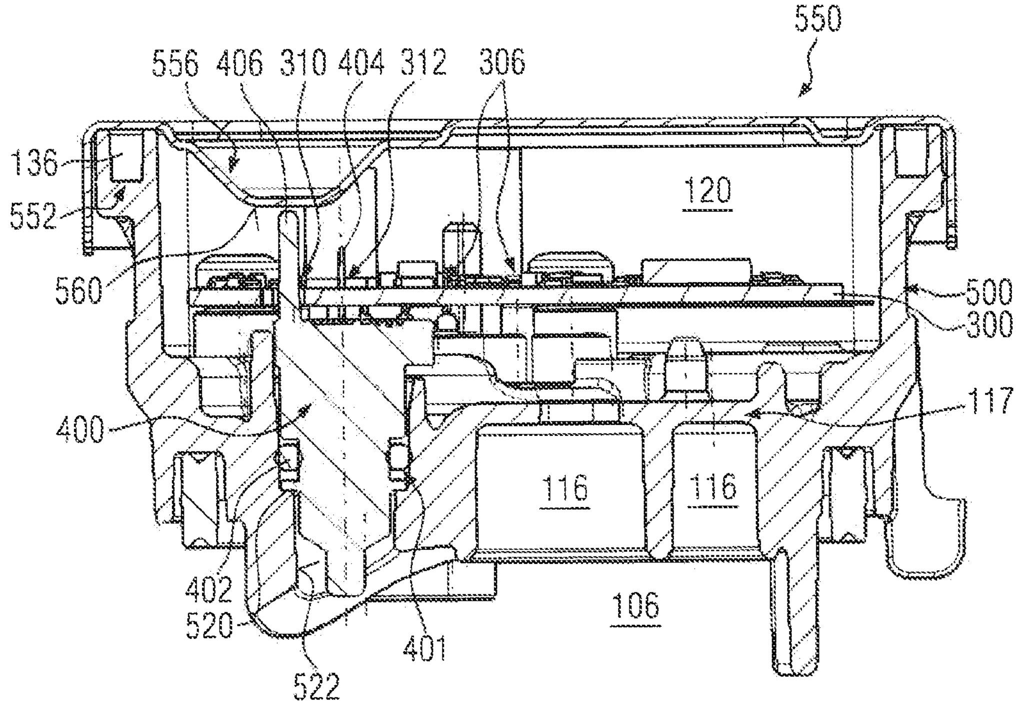
FIG. 4 shows a longitudinal section view along the line IV-IV as shown in FIG. 2.
Figure 5:
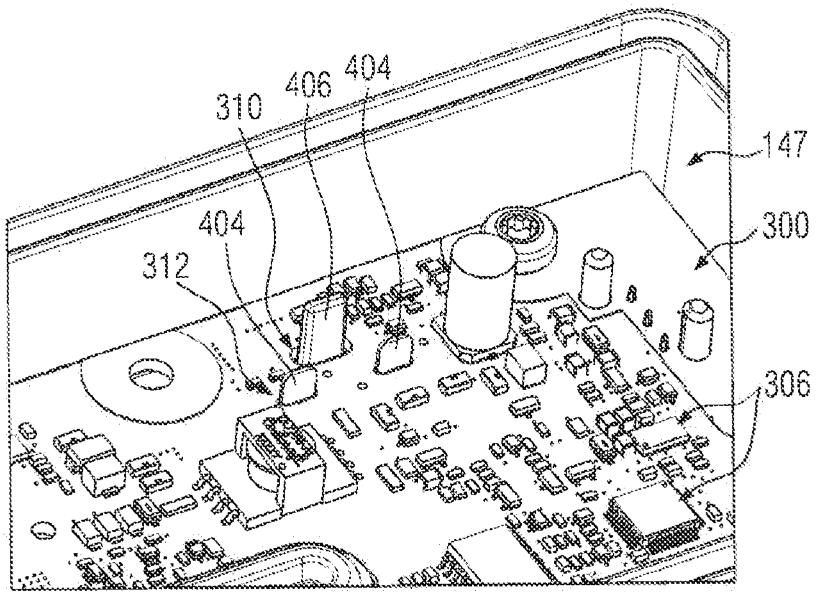
FIG. 5 shows a perspective enlarged top view of the equipped circuit board of the embodiment with parts of the temperature sensor.

The temperature sensor receptacle identified with reference sign 506 in FIG. 3 passes via a collar 520 into a region of smaller diameter 522 (as shown in FIG. 4), where the actual heat-sensitive measuring tip of the temperature sensor 400 is located.

It can be seen that the temperature sensor seal 402 is located in a cylindrical area of the temperature sensor receptacle 506. FIG. 4 shows that the temperature sensor 400 is limited in the axial direction between the collar 520 of the housing upper part 500 and the support projection 556. Thus, the temperature sensor 400 can only be moved within limits in the axial direction, i.e. in the direction of insertion of the temperature sensor 400 in the temperature sensor receptacle 506. As FIG. 4 further illustrates, the temperature sensor receptacle 506 has a slightly conical opening, through which the temperature sensor seal 402 is centered and compressed when the temperature sensor 400 is inserted into the temperature sensor receptacle 506. The temperature sensor seal 402 is thus compressed in the receptacle 506 for the temperature sensor 400, resulting in a reliable seal between the heating chamber 106 and the connection chamber 120.

The temperature sensor 400 is not screwed or glued to the housing upper part 400. Rather, its positioning is determined solely by the two stops, in this case formed by the collar 520 and the support projection 556. For the realization of the invention, it is not necessary that the temperature sensor 400 is actually held in the temperature sensor receptacle 506 so that it can move axially. The only significant fact is that there is no screw connection or gluing or any other direct connection between the housing upper part 500 and the temperature sensor 400 and that the latter is only inserted into the temperature sensor receptacle 506 to create the necessary interaction between the temperature sensor 400 and the housing upper part 500. Accordingly, the temperature sensor receptacle 506 surrounds the temperature sensor 400 in circumferential direction. In particular, it provides a contact surface for the temperature sensor seal 402. However, an axially acting fixation of the temperature sensor 400 directly on both sides of the temperature sensor 400 is not provided on the housing upper part 500. The collar 520 and the support projection 556 serve as stops, which prevent the temperature sensor 400 from sliding out. Thereby, the support is effected by the support surface 560. In the embodiment shown, this is formed on a projecting support projection 556. However, other configurations are also conceivable, such as a stop attached to the housing upper part 500, which completely or partially protrudes over the temperature sensor 400 in the direction of insertion.

The invention claimed is:

1. An electric heating device comprising:

a housing with a partition wall which separates a connection chamber from a heating chamber for dissipating heat;

at least one PTC heating device which protrudes from the housing as a heating fin in a direction toward the heating chamber, wherein the PTC heating device comprises at least one PTC element and conductor tracks, that are electrically conductively connected to the PTC element in the connection chamber, for energizing the PTC element; and a temperature sensor which is connected to a control device, and which is accommodated in a sealed manner in a temperature sensor receptacle which is formed in a wall delimiting the heating chamber, wherein the temperature sensor is accommodated in a sliding manner in the temperature sensor receptacle, and wherein a support, cooperating with the temperature sensor, is provided for the temperature sensor and prevents the temperature sensor from sliding out of the temperature sensor receptacle, and wherein the support is provided outside the temperature sensor receptacle, and wherein the support is provided on a side of the housing opposite the heating chamber and the wall.

2. The electric heating device according to claim 1, wherein at least one temperature sensor contact element of the temperature sensor is exposed in the connection chamber and is plugged into a printed circuit board arranged in the connection chamber.

3. An electric heating device comprising:

a housing with a partition wall which separates a connection chamber from a heating chamber for dissipating heat;

at least one PTC heating device which protrudes from the housing as a heating fin in a direction toward the heating chamber, wherein the PTC heating device comprises at least one PTC element and conductor tracks, that are electrically conductively connected to the PTC element in the connection chamber, for energizing the PTC element; and a temperature sensor which is connected to a control device, and which is accommodated in a sealed manner in a temperature sensor receptacle which is formed in a wall delimiting the heating chamber, wherein the temperature sensor is accommodated in a sliding manner in the temperature sensor receptacle, and wherein a support, cooperating with the temperature sensor, is provided for the temperature sensor and prevents the temperature sensor from sliding out of the temperature sensor receptacle, and wherein the support is provided outside the temperature sensor receptacle, and wherein the temperature sensor has at least one temperature sensor contact element which is plugged into a printed circuit board, and a retaining projection which protrudes through the printed circuit board and which is received in a guide bore which is recessed in the printed circuit board.

4. The electric heating device according to claim 1, wherein the support is provided on a housing cover which covers a chamber accommodating the circuit board.

5. The electric heating device according to claim 4, wherein the housing cover is connected in a form-fitting manner with a housing upper part enclosing the printed circuit board between itself and the housing cover.

6. The electric heating device according to claim 4, wherein the housing cover is formed from a stamped-bent sheet metal element having a support projection protruding in a direction toward the temperature sensor and interacting with a retaining projection of the temperature sensor.

7. An electric heating device comprising:

a housing with a partition wall which separates a connection chamber from a heating chamber for dissipating heat;

at least one PTC heating device which protrudes as a heating fin from the housing in a direction toward the heating chamber, wherein the PTC heating device comprises at least one PTC element and conductor tracks which are electrically conductively connected to the PTC element in the connection chamber and which are configured to energize the PTC element, and a temperature sensor which is connected to a control device and which is accommodated in a sealed manner in a temperature sensor receptacle which is formed in a wall of the housing delimiting the heating chamber, wherein at least one temperature sensor contact element of the temperature sensor is exposed in the connection chamber and is plugged into a printed circuit board arranged in the connection chamber; and wherein the temperature sensor has at least one temperature sensor contact element which is plugged into a printed circuit board, and a retaining projection which protrudes through the printed circuit board and which is received in a guide bore which is recessed in the printed circuit board.

8. The electric heating device according to claim 7, wherein the temperature sensor is accommodated in a sliding manner in the temperature sensor receptacle, and wherein a support, cooperating with the temperature sensor, is provided for the temperature sensor, which support prevents the temperature sensor from sliding out of the temperature sensor receptacle.

9. The electric heating device according to claim 8, wherein the support is provided on a side of the housing opposite the heating chamber and the wall.

10. The electric heating device according to claim 9, wherein the support is provided on a housing cover which covers a chamber accommodating the circuit board.

11. The electric heating device according to claim 10, wherein the housing cover is connected in a form-fitting manner with a housing upper part enclosing the printed circuit board between itself and the housing cover.

12. The electric heating device according to claim 10, wherein the housing cover is formed from a stamped-bent sheet metal element having a support projection protruding in a direction toward the temperature sensor and interacting with a retaining projection of the temperature sensor.

13. The electric heating device according to claim 1, wherein the temperature sensor receptacle includes a collar, and wherein a region of the temperature sensor receptacle after the collar has a smaller diameter than a region of the temperature sensor receptacle before the collar.

* * * * *